United States Patent
Krajnc et al.

(10) Patent No.: US 12,504,527 B2
(45) Date of Patent: Dec. 23, 2025

(54) ORCHESTRATED RADIO FREQUENCY BASED SENSING IN MULTIPLE SENSING AREAS

(71) Applicant: SIGNIFY HOLDING B.V., Eindhoven (NL)

(72) Inventors: Hugo José Krajnc, Eindhoven (NL); Peter Deixler, Arlington, MA (US)

(73) Assignee: SIGNIFY HOLDING B.V., Eindhoven (NL)

(*) Notice: Subject to any disclaimer, the term of this patent is extended or adjusted under 35 U.S.C. 154(b) by 262 days.

(21) Appl. No.: 18/271,068

(22) PCT Filed: Dec. 28, 2021

(86) PCT No.: PCT/EP2021/087705
§ 371 (c)(1),
(2) Date: Jul. 6, 2023

(87) PCT Pub. No.: WO2022/148690
PCT Pub. Date: Jul. 14, 2022

(65) Prior Publication Data
US 2024/0085546 A1    Mar. 14, 2024

Related U.S. Application Data

(60) Provisional application No. 63/134,634, filed on Jan. 7, 2021.

(30) Foreign Application Priority Data

Feb. 18, 2021  (EP) .................................. 21157760

(51) Int. Cl.
G01S 13/04  (2006.01)
G01S 13/00  (2006.01)
G01S 13/48  (2006.01)

(52) U.S. Cl.
CPC ............ G01S 13/04 (2013.01); G01S 13/003 (2013.01); G01S 13/48 (2013.01)

(58) Field of Classification Search
CPC ......... G01S 13/04; G01S 13/003; G01S 13/48
(Continued)

(56) References Cited

U.S. PATENT DOCUMENTS 9,234,958 B2 *  1/2016  Syrjarinne .............. G01S 5/014
10,135,667 B1 * 11/2018  Greer ........................ G01S 1/24
(Continued)

FOREIGN PATENT DOCUMENTS

WO  2020043592 A1  3/2020
WO  2020043606 A1  3/2020
(Continued)

Primary Examiner — William Kelleher
Assistant Examiner — Samarina Makhdoom

(57) ABSTRACT

The present invention relates to performing radio frequency based sensing in multiple sensing areas (50, 60) by multiple nodes (26, 28, 30, 38, 40, 42) located at different locations. A first group (25) of nodes includes at least two of the multiple nodes (26, 28, 30) and performs radio frequency based sensing in a first sensing area (50) for detecting a first sensing event. A second group (25') of nodes including at least two of the multiple nodes (38, 40, 42) is configured for performing radio frequency based sensing in a second sensing area (60) for detecting a second sensing event based on findings obtained by performing radio frequency based sensing in the first sensing area (50). The nodes (26, 28, 30, 38, 40, 42) may perform radio frequency based sensing based on multiple communication technologies (34). The findings may include which communication technology allows confidently detecting a sensing event.

12 Claims, 5 Drawing Sheets

(58) Field of Classification Search
USPC .......................................................... 342/27
See application file for complete search history.

(56) References Cited

U.S. PATENT DOCUMENTS

| | | | | |
|---|---|---|---|---|
| 2011/0032139 | A1* | 2/2011 | Benitez | G01S 13/56 |
| | | | | 342/28 |
| 2018/0014160 | A1 | 1/2018 | Wootton et al. | |
| 2018/0292520 | A1* | 10/2018 | Bermudez | F24F 11/30 |
| 2018/0365975 | A1* | 12/2018 | Xu | G08B 29/185 |

FOREIGN PATENT DOCUMENTS

| | | |
|---|---|---|
| WO | 2020229441 A1 | 11/2020 |
| WO | 2021023725 A1 | 2/2021 |

\* cited by examiner

ORCHESTRATED RADIO FREQUENCY BASED SENSING IN MULTIPLE SENSING AREAS

CROSS-REFERENCE TO PRIOR APPLICATIONS

This application is the U.S. National Phase application under 35 U.S.C. § 371 of International Application No. PCT/EP2021/087705, filed on Dec. 28, 2021, which claims the benefit of U.S. Provisional Patent Application No. 63/134,634, filed on Jan. 7, 2021 and European Patent Application Ser. No. 21/157,760.6, filed on Feb. 18, 2021. These applications are hereby incorporated by reference herein.

FIELD OF THE INVENTION

The present invention relates to a radio frequency (RF) system for performing RF-based sensing in multiple sensing areas, a method for performing RF-based sensing in multiple sensing areas, and a computer program product for performing RF-based sensing in multiple sensing areas.

BACKGROUND OF THE INVENTION

WO 2020/043606 A1 shows a controller, system, method, and computer program product for controlling a wireless network to perform RF-based motion detection. Thereto, the invention provides a controller for controlling a wireless network comprising a plurality of nodes to perform RF-based motion detection, wherein each unique pair of the plurality of nodes forms a respective node pair and collectively results in a plurality of node pairs, wherein the controller is configured to: select a reference node pair from the plurality of node pairs; obtain at least one reference characteristic of the reference node pair; select a subset of node pairs from the plurality of node pairs, wherein each respective node pair in the subset of node pairs comprises a respective characteristic matching the at least one reference characteristic; perform the RF-based motion detection with said subset of node pairs. In an embodiment, the reference node pair may be located within a first subspace and at least one node pair of the plurality of node pairs may be located within a second subspace; wherein the first subspace may be different to the second subspace.

WO 2020/229441A1 discloses a receiver (100) for an RF presence-sensing arrangement (150). The receiver is configured to receive a first intra-network RF sensing signal (102) from a first transmitter (104), both pertaining to a first local-area RF communication network (106) spanning a first presence-sensing volume (114) and to additionally receive an inter-network RF sensing signal (108) from a second transmitter (110) pertaining to a second local-area RF communication network (112), thus spanning a third presence-sensing volume (120) and to provide a first and an inter-network signal-strength signal (S1, S3) indicative of a respective received-signal strength. In the RF presence-sensing arrangement, a presence detection unit (122) is configured to provide, based on the signal-strength signals, a presence detection signal (SDET) indicative of a change in presence of a subject or object in the first or in the third presence-sensing volume, thus increasing the accuracy of the presence determination.

SUMMARY OF THE INVENTION

It can be seen as an object of the present invention to provide an RF system for performing RF-based sensing in multiple sensing areas, a method for performing RF-based sensing in multiple sensing areas, a computer program product for performing RF-based sensing in multiple sensing areas, and a computer readable medium which allow performing RF-based sensing with improved detection performance, improved latency, or both.

In a first aspect of the present invention an RF system including multiple nodes at different locations for performing RF-based sensing in multiple sensing areas is presented. A first group of nodes including at least two of the multiple nodes is configured for performing RF-based sensing in a first sensing area for detecting a first sensing event. The RF system is configured for configuring a second group of nodes including at least two of the multiple nodes for performing RF-based sensing in a second sensing area for detecting a second sensing event; wherein the radio frequency system (100) is configured to obtain findings obtained by performing RF-based sensing in the first sensing area; and wherein the second group is configured based on the obtained findings.

Since the first group performs RF-based sensing in the first sensing area and the second group is configured based on the findings obtained by performing RF-based sensing in the first sensing area, detection in the first sensing area can be used to upfront improve the detection performance in the second sensing area, in particular, if the second sensing area is spatially adjacent to the first sensing area. This may allow optimizing detection performance and/or latency, as the second group may be configured upfront based on the findings of performing RF-based sensing in the first sensing area. This particularly may be helpful for situations in which the first sensing event detected in the first sensing area is expected to cause the second sensing event to occur in the second sensing area, e.g. a person moving through a home, a worker carrying objects in a warehouse from the first sensing area to the second sensing area, etc. For example, the same or similar settings for performing RF-based sensing may be used in the second sensing area for detecting the second sensing event which successfully detected the first sensing event in the first sensing area. This may particularly be helpful in case that the first sensing event and the second sensing event are of an identical event type, e.g., the same person walking through both sensing areas, and the sensing areas have similar characteristics. The settings for performing RF-based sensing may also be adapted in case that the first sensing event and the second sensing event are different and/or in case that the sensing areas have different characteristics, taking into account these differences. The radio frequency system (100) is configured to obtain findings obtained by performing RF-based sensing in the first sensing area. In an example, the first group of nodes may be arranged for obtaining findings obtained by performing RF-based sensing in the first sensing area or at least one of the multiple nodes may be arranged for obtaining findings obtained by performing RF-based sensing in the first sensing area.

The second sensing area may be spatially adjacent to the first sensing area. The RF system may be configured for determining whether the second sensing area is spatially adjacent to the first sensing area, for example, based on a floorplan including locations of the sensing areas or motion trails.

The RF system may be configured for determining whether the second sensing area is affected by the first sensing event detected in the first sensing area. The RF system may be configured for configuring the second group for performing RF-based sensing in the second sensing area for detecting the second sensing event based on the findings obtained by performing RF-based sensing in the first sensing area if the second sensing area is affected by the first sensing event detected in the first sensing area.

The RF system may be configured for configuring the first group for performing RF-based sensing in the first sensing area for detecting the first sensing event.

The first sensing area may be defined based on locations of the nodes of the first group. The second sensing area may be defined based on locations of the nodes of the second group. The first group may include one or more nodes of the second group and vice versa. The first sensing area and/or the second sensing area may also be predetermined, i.e., the first sensing area, the second sensing area, or the first and the second sensing area may be predetermined.

The RF system may be configured for forming the second group of nodes including the at least two of the multiple nodes based on the findings obtained by performing RF-based sensing in the first sensing area. The second group may include one or more of the nodes of the first group.

The second group may be configured for performing RF-based sensing in the second sensing area.

RF-based sensing allows for the detection of various sensing events taking place in a sensing area, i.e., a specific space or specific volume. Sensing algorithms or sensing analysis algorithms may detect and analyze how tangible entities within the sensing area affect RF signals. RF signals are used for transmitting RF messages. RF-based sensing may be used as means for detecting and classifying sensing events, such as user activity in homes, offices, etc. For example, based on Zigbee RF-based sensing messages being transmitted and received by nodes in form of smart lights, RF-based sensing may determine motion in a room and turn lights on or off automatically, nodes in form of WiFi routers may estimate breathing rate of people, etc.

The underlying principle for RF-based sensing is that distortions of RF signals in a space are both a function of the tangible entities in it, e.g., moving objects, as well as of the frequency of the RF signals. When RF-based sensing hops through a series of very different frequency bands, e.g., from 2.4 GHz WiFi to 5 GHz WiFi and then to 60 GHz as used by the upcoming WiFi 6 standard, this may yield distinctively different passive sensing results. However, also frequency channels in the same frequency band, e.g., in 2.4 GHz WiFi Channel 1 at 2412 MHz and WiFi Channel 13 at 2472 MHz, will influence the RF-based sensing results.

RF-based sensing can be performed in the RF system by transmitting RF signals from one node to another node and analyzing the received RF signals. If the RF signals interact with one or more tangible entities, e.g., objects or persons, on their transmission paths between the nodes, the RF signals are disturbed, such as scattered, absorbed, reflected, or any combination thereof. These disturbances can be analyzed and used for performing RF-based sensing.

The disturbed and/or reflected RF signals can include an RF-based sensing fingerprint based on signal parameters, such as real and imaginary part of electrical permittivity and magnetic susceptibility. Different communication technologies have different absorption and reflection characteristics resulting in different RF-based sensing fingerprints. Using different communication technologies can allow to optimize the performance of the RF-based sensing.

The multiple nodes may be configured for performing RF-based sensing in multiple sensing areas based on multiple communication technologies. The first group may be configured for performing RF-based sensing by a first single-channel communication technology. Additionally, the first group may be configured upon detecting the first sensing event in the first sensing area to select a first multi-channel communication technology in dependence of the first single-channel communication technology used for detecting the first sensing event and/or based on findings obtained by performing RF-based sensing by the first single-channel communication technology in the first sensing area. The first group may additionally be configured to perform RF-based sensing based on the first multi-channel communication technology in the first sensing area. This allows to initially perform a coarse detection using a single-channel communication technology and to subsequently perform a fine grained detection using a multi-channel communication technology. This may reduce energy consumption while improving RF-based sensing.

Detecting the first sensing event in the first sensing area by the first single-channel communication technology may include, for example, detecting that a confidence level for detecting the first sensing event is above a single-channel threshold confidence level. For example, if the confidence level is above a first single-channel threshold confidence level, this may indicate that the first sensing event probably occurred. But the confidence may not be sufficient to be sure that the first sensing event occurred such that RF-based sensing is performed by the first multi-channel communication technology for confirming the first sensing event or for determining an expected sensing event which is expected to occur in view of the first sensing event. The first sensing event and the expected sensing event may be of identical type, e.g., the same person walking around in the first sensing area. If, for example, the confidence level is above a second single-channel threshold confidence level, this may indicate that the first sensing event has occurred, i.e., with sufficient confidence.

A communication technology is defined by a setting of communication technology parameters including a communication protocol, one or more frequency channels, and a frequency channel bandwidth of the respective frequency channel. The communication technology may additionally include, for example, a number of streams, a stream data rate, and a modulation. Changing the setting by changing one of the communication technology parameters typically changes the communication technology. The communication technologies may include single-channel communication technologies and multi-channel communication technologies. Each of the frequency channels has a center frequency and a frequency channel bandwidth. The frequency channels may have partially overlapping frequencies. Hopping through different frequency channels of a set of frequency channels can be performed for minimizing interference of RF signals, for example, in case a multi-channel communication technology is used for performing RF-based sensing such as a Bluetooth communication protocol, e.g., Bluetooth low energy (BLE). Changing a frequency channel to another frequency channel of the set of frequency channels of the communication technology does not change the communication technology if the communication technology is defined by the set of frequency channels. Changing a frequency channel of the communication technology to another frequency channel changes the communication technology if the communication technology is defined by only one frequency channel.

The communication technology parameters can additionally include one or more of a demodulation and a directionality. For example, a certain modulation can be demodulated in different ways by two or more different demodulations, such as for example to balance a demodulation speed and a demodulation error rate. Directionality can, for example, include omnidirectional and directional transmission. Omnidirectional transmissions can, for example, allow a volumetric view of the sensing volume, while directional transmissions can, for example, allow a narrow beam, e.g. for scanning like a laser scanner or for having a fixed directionality.

The communication protocol included in the communication technology parameters for a certain communication technology can include, for example, a cellular radio communication protocol, Zigbee, Bluetooth, BLE, Thread, Long Range (LoRa), a WiFi communication protocol, or any other wireless communication protocol. In other words, the communication technologies may include communication protocols such as a cellular radio communication protocol, Zigbee, WiFi, BLE, Thread, or any other wireless communication protocol. Cellular radio communication protocols may, for example, include 5G, 4G, 3G, or any other cellular radio communication protocol. WiFi communication protocols may include protocols of the IEEE 802.11 family, such as IEEE 802.11ax and IEEE 802.11ay.

The frequency channels included in the communication technology parameter can include frequency values, for example, in the GHz range, such as 2.4 GHz band, 5 GHz band, and 60 GHz band, including for example different frequency channels in the same band, e.g., 2412 MHz and 2472 MHz in the 2.4 GHz band. The frequency channels may also include frequency values in the frequency bands ranging from 450 MHz to 6 GHz, e.g., for sub-6 GHz 5G or from 24.250 GHz to 52.600 GHz for millimeter-wave 5G.

The number of streams included in the communication technology parameter can include, for example, one or more streams, such as 2, 3, or 4 streams. The maximal number of streams can, for example, depend on the number of multiple input multiple output (MIMO) channels.

The modulation included in the communication technology parameter can include, for example, orthogonal frequency-division multiplexing (OFDM), direct-sequence spread spectrum (DSSS), frequency-hopping spread spectrum (FHSS), on-off keying (OOK), binary phase shift keying (BPSK), quadrature phase shift keying (QPSK), quadrature amplitude modulation (QAM), or any other modulation.

Values of the communication technology parameters can also be included and selected from standards, such as standards for communication protocols published by the IEEE, such as IEEE 802.15.4, IEEE 802.11ax, IEEE 802.11ay, or any other communication protocol.

A single-channel communication technology is a communication technology which transmits an RF message using a single frequency channel, i.e., the single-channel communication technology uses a single frequency channel with a certain center frequency and frequency channel bandwidth for transmitting the RF message. The single frequency channel can include a frequency range defined by the center frequency and the frequency channel bandwidth, i.e., the single frequency channel is not limited to its center frequency, but can also, for example, include neighboring frequencies in dependence of the frequency channel bandwidth. Furthermore, sideband emissions, i.e., out-of-band emissions, may occur outside of the standardized frequency band defined by the center frequency and frequency channel bandwidth. The single channel-communication technology may use a communication protocol which may in general allow performing RF-based sensing by using multiple frequency channels, which communication protocol, however, in this case is limited to using only one single frequency channel for transmitting the RF message. The single-channel communication technology may include, for example, Zigbee, LoRa, or a WiFi communication protocol. The single-channel communication technology may also include a single-channel communication protocol, i.e., a communication protocol which can perform RF-based sensing only by using a single frequency channel for transmitting RF messages. Using a single-channel communication technology for performing RF-based sensing may allow lowering calculation effort and complexity of RF-based sensing.

A multi-channel communication technology is a communication technology which hops through multiple frequency channels during the transmission of an RF message. Alternatively, or additionally, the multi-channel communication technology may also use the multiple frequency channels in parallel. The multi-channel communication technology may include a multi-channel communication protocol such as BLE. Each RF message may be chopped into parts and transmitted using different frequency channels of the multi-channel communication technology. For example, BLE can transmit the header of an RF message in the BLE channel 5, then the first half of the payload in channel 9, and the second half in channel 20. Using a multi-channel communication technology for performing RF-based sensing may allow RF-based sensing with higher accuracy as the effects tangible entities and the environment have on the RF signals differ slightly depending on the frequency used.

The same communication protocol may be included in a single-channel communication technology and a multi-channel communication technology. In this case the communication protocol is limited to using only one single frequency channel for transmitting the RF message for the single-channel communication technology while for the multi-channel communication technology multiple frequency channels are used for transmitting the RF message.

The nodes may include, for example, a dual radio configured for performing two different communication technologies, e.g. Zigbee and BLE.

The first group may be configured for performing the RF-based sensing by the first single-channel communication technology in dependence of a setting of communication technology parameters of the first single-channel communication technology that is optimized for detecting the first sensing event. Alternatively, or additionally, the first group may be configured for performing the RF-based sensing by the first multi-channel communication technology in dependence of a setting of communication technology parameters of the first multi-channel communication technology that is optimized for detecting an expected sensing event in the first sensing area. This may allow optimizing the setting of the communication technology parameters for the respective sensing application.

The RF system may be configured for determining the expected sensing event based on the findings obtained by performing RF-based sensing by the first single-channel communication technology in the first sensing area. The expected sensing event may be the first sensing event or another sensing event, i.e., the first sensing event and the expected sensing event may be sensing events of identical type or sensing events of different type. For example, a person may be detected as first sensing event, while the expected sensing event may be of different type, such as recognizing an activity of the person, e.g., recognizing a gait of a person. Alternatively, the expected sensing event may be detecting the person in order to confirm the first sensing event by increasing the confidence for detecting the first sensing event. In this case, the expected sensing event is of identical type as the first sensing event.

The RF system may be configured for using the setting of communication technology parameters used for performing RF-based sensing in the first sensing area for performing RF-based sensing in the second sensing area. Alternatively, the RF system may be configured for adapting or replacing the setting of the communication technology parameters used for performing RF-based sensing in the second sensing area based on the findings obtained by performing RF-based sensing in the first sensing area and/or based on the second sensing event in the second sensing area.

The RF system may be configured for configuring the second group based on selecting a second single-channel communication technology or a second multi-channel communication technology for performing RF-based sensing in the second sensing area for detecting the second sensing event based on the findings obtained by performing RF-based sensing in the first sensing area. This allows to determine whether the first sensing event is only successfully detectable by performing RF-based sensing by the first multi-channel communication technology such that the second group may perform RF-based sensing by the second multi-channel communication technology instead of first trying to detect the second sensing event by the second single-channel communication technology which would add latency as the second group would need to perform RF-based sensing by the second multi-channel communication technology for detecting the second sensing event anyway.

The first single-channel communication technology and the second single-channel communication technology may be identical or different, e.g., adapted by taking into account differences between the first sensing area and the second sensing area. Alternatively, or additionally, the first multi-channel communication technology and the second multi-channel communication technology may be identical or different, e.g., adapted by taking into account differences between the first sensing area and the second sensing area.

The second group may be configured for performing RF-based sensing based on the second single-channel communication technology or the second multi-channel communication technology in the second sensing area for detecting the second sensing event.

The RF system may be configured for determining whether the first sensing event detected in the first sensing area will affect the second sensing area based on the findings obtained by performing RF-based sensing in the first sensing area.

The first and second multi-channel communication technologies may be used temporarily or in a time-shared fashion with the first and second single-channel communication technologies for performing RF-based sensing.

The multi-channel communication technology may include frequency hopping in which the multi-channel communication technology scans through multiple frequencies per RF message. This may allow obtaining richer sensing data as RF sensing signal interaction with the surroundings is greatly influenced by the different frequency channels the messages hop through.

The first sensing event and the second sensing event may be sensing events of identical type. Alternatively, or additionally, the expected sensing event and the second sensing event may be sensing events of identical type.

The RF system may be configured for configuring the second group for selecting the second single-channel communication technology if the first group detected the first sensing event with a confidence level above a single-channel threshold confidence level by performing RF-based sensing by the first single-channel communication technology. Alternatively, or additionally, the RF system may be configured for configuring the second group for selecting the second multi-channel communication technology if the first group detected the first sensing event with a confidence level above a multi-channel threshold confidence level by performing RF-based sensing by the first multi-channel communication technology. This allows to decide upfront whether to use a single-channel communication technology or multi-channel communication technology in the second sensing area based on the findings of the first sensing area, e.g., whether confidence level for detecting the sensing event is sufficient by performing RF-based sensing by the single-channel communication technology or whether RF-based sensing needs to be performed by the multi-channel communication technology in order to achieve a sufficient confidence level. This may allow reducing latency and improving detection performance.

The single-channel threshold confidence level may be, for example, a second single-channel threshold confidence level higher than a first single-channel threshold confidence level. The RF system may be configured for selecting a first multi-channel communication technology for performing RF-based sensing in the first sensing area, e.g., for confirming detection of the first sensing event, if the first sensing event is detected with a confidence level above the first single-channel threshold confidence level but below the second single-channel threshold confidence level. In case the first sensing event is detected with a confidence level above the second single-channel threshold confidence level, the RF system may be configured for configuring the second group for selecting the second single-channel communication technology.

In one embodiment, the RF system may be configured for configuring the second group for selecting the second multi-channel communication technology if the first group performed RF-based sensing by the first multi-channel communication technology.

The RF system may be configured for configuring the second group for selecting the respective communication technology by selecting a setting of the communication technology parameters of the respective communication technology.

The RF system may be configured for selecting the at least two nodes of the second group from the multiple nodes for forming the second group based on the findings obtained by performing RF-based sensing in the first sensing area. This may allow to further improve detection performance as the nodes included in the second group for performing RF-based sensing serve as additional factor for optimizing the detection performance.

The second sensing area may be, for example, located spatially adjacent to the first sensing area. The at least two nodes of the second group may include one or more nodes of the first group.

The RF system may be configured for selecting the at least two nodes of the second group from the multiple nodes for forming the second group such that the second sensing event is expected to occur in the second sensing area in which the second group performs RF-based sensing based on the findings obtained by performing RF-based sensing in the first sensing area.

The RF system may be configured for configuring the second group for performing RF-based sensing in the second sensing area based on a difference between the first group and the second group. Alternatively, or additionally, the RF system may be configured for configuring the first group for performing RF-based sensing in the first sensing area based on the difference between the first group and the second group. The difference between the first group and the second group may include a different amount, types, capabilities, and/or relative locations of the nodes of the respective group. This allows to take into account the difference between the groups when configuring the groups for performing RF-based sensing and thus may allow to improve detection performance and reduce latency.

Additionally, or alternatively, the RF system may be configured for configuring the second group for performing RF-based sensing in the second sensing area based on a difference between the first sensing area and the second sensing area. This allows to take into account the difference between the sensing areas when configuring the groups for performing RF-based sensing and thus may allow to improve detection performance and reduce latency. Differences between the first sensing area and the second sensing area may include, for example, different sizes of the sensing areas, different sources of wireless interference in the sensing areas, different objects in the sensing areas, and/or different materials in the sensing areas. Sources of wireless interference may include, for example, a microwave oven, a table computer, or any other source that transmits RF signals.

The RF system may be configured for configuring the second group for performing RF-based sensing in the second sensing area based on external effects influencing an operation of the nodes. Alternatively, or additionally, the RF system may be configured for configuring the first group for performing RF-based sensing in the first sensing area based on the external effects influencing the operation of the nodes. This may allow to take into account external effects when configuring the groups for performing RF-based sensing and thus may allow to improve detection performance. External effects influencing the operation of the nodes may include, for example, wireless interference. The external effects may be, for example, temporary. In this case, the RF system may be configured for configuring the second group and/or the first group to temporarily perform RF-based sensing based on adapted settings which are adapted based on the temporary external effects, e.g., as long as the temporary external effects affect the RF-based sensing performed by the second group and/or the first group.

The RF system may be configured for configuring the second group for performing RF-based sensing in the second sensing area based on a difference between the first sensing event and the second sensing event. Alternatively, or additionally, the RF system may be configured for configuring the first group for performing RF-based sensing in the first sensing area based on the difference between the first sensing event and the second sensing event. The difference between the first sensing event and the second sensing event may include, for example, a change of the object to be detected or a change of the sensing application. For example, the first sensing event may be detecting a user. The user may take up an object when entering the second sensing area such that the respective RF fingerprint to be detected by the second sensing event changes compared to the first sensing event, e.g., to a user carrying an object. Since the second group may be configured based on the difference between the first sensing event and the second sensing event, this may be taken into account when configuring the second group. For example, a respective adapted setting of communication technology parameters of the communication technology used by the second group may be used for performing RF-based sensing by the second group. This may allow an improved detection performance and/or reduced latency. Additionally, the setting of the communication technology parameters of the communication technology used by the first group may be adapted subsequently, if for example, the user carrying the object is expected to move back to the first sensing area. This may allow to improve the detection performance of the first group and reduce its latency. In general, this may allow the RF system to quickly recover from potential lagging memory effects and adapt to whatever a context requires in a respective sensing area.

The RF system may be configured for forming the first group of nodes by selecting the at least two nodes of the first group from the multiple nodes based on the first sensing event to be detected, e.g., detecting a user, recognizing an activity of the user or any other sensing event. Alternatively, or additionally, the RF system may be configured for forming the first group of nodes by selecting the at least two nodes of the first group from the multiple nodes based on the first sensing area, e.g., the size or relative location of the first sensing area, for example, with respect to the second sensing area. Forming the first group by selecting its nodes may allow to increase flexibility for performing RF-based sensing. This may allow to improve detection performance and/or to reduce latency.

The RF system may be configured for adapting one of the sensing areas based on findings obtained by performing RF-based sensing in the other sensing area. The one of the sensing areas may be adapted, for example, by including one or more nodes to the group performing RF-based sensing in the one of the sensing areas, by removing one or more nodes from the group performing RF-based sensing in the one of the sensing areas, by adjusting a direction of a beam between at least two of the nodes of the group performing RF-based sensing in the one of the sensing areas, by adjusting a beam-shape of the beam between the at least two of the nodes of the group performing RF-based sensing in the one of the sensing areas, by adjusting a spatial divergence of the beam between the at least two of the nodes of the group performing RF-based sensing in the one of the sensing areas, by adjusting receive beamforming at at least one of the nodes receiving RF signals for performing RF-based sensing, or by any combination thereof based on findings obtained by performing RF-based sensing in the other sensing area. For example, the first group may be adapted by including one or more nodes to the first group, by removing one or more nodes from the first group, or by including one or more nodes to the first group and removing one or more nodes from the first group based on findings obtained by performing RF-based sensing in the second sensing area. In this manner, the first sensing area may be adapted in case that the nodes of the first group define the first sensing area.

Alternatively, or additionally, the RF system may be configured for configuring the first group for performing RF-based sensing in the first sensing area for detecting the first sensing event based on findings obtained by performing RF-based sensing in the second sensing area.

If the confidence level for detecting sensing events is higher for the setting of the communication technology parameters of the communication technology used by the second group than for the setting of the communication technology parameters of the communication technology used by the first group, the setting of the communication technology parameters of the communication technology used by the first group may be adapted in order to improve the confidence level for detecting the first sensing event. This may allow to optimize the setting of the communication technology parameters and thus may allow improving detection performance.

In a further aspect of the present invention a method for performing RF-based sensing in multiple sensing areas by multiple nodes located at different locations is presented.

The method includes the steps:
performing RF-based sensing by a first group of nodes including at least two of the multiple nodes in a first sensing area for detecting a first sensing event, and
configuring a second group of nodes including at least two of the multiple nodes for performing RF-based sensing in a second sensing area for detecting a second sensing event based on findings obtained by performing RF-based sensing in the first sensing area.

The method may comprise one or more of the steps:
configuring the first group for performing RF-based sensing in a first sensing area for detecting a first sensing event, and
forming the second group of nodes including at least two of the multiple nodes based on the findings obtained by performing RF-based sensing in the first sensing area.

Alternatively, or additionally, the method may comprise one or more of the steps:
performing RF-based sensing in the second sensing area for detecting the second sensing event,
performing RF-based sensing in multiple sensing areas based on multiple communication technologies,
performing the RF-based sensing by the first group by a first single-channel communication technology,
upon detecting the first sensing event in the first sensing area, selecting a first multi-channel communication technology in dependence of the first single-channel communication technology used for detecting the first sensing event and/or based on findings obtained by performing RF-based sensing by the first single-channel communication technology in the first sensing area,
performing RF-based sensing based on the first multi-channel communication technology in the first sensing area,
performing the RF-based sensing by the first group by the first single-channel communication technology in dependence of a setting of communication technology parameters of the first single-channel communication technology that is optimized for detecting the first sensing event,
performing the RF-based sensing by the first group by the first multi-channel communication technology in dependence of a setting of communication technology parameters of the first multi-channel communication technology that is optimized for detecting an expected sensing event in the first sensing area,
configuring the second group based on selecting a second single-channel communication technology or a second multi-channel communication technology for performing RF-based sensing in the second sensing area for detecting the second sensing event based on the findings obtained by performing RF-based sensing in the first sensing area,
performing RF-based sensing based on the second single-channel communication technology or the second multi-channel communication technology in the second sensing area for detecting the second sensing event,
configuring the second group for selecting the second single-channel communication technology if the first group detected the first sensing event with a confidence level above a single-channel threshold confidence level by performing RF-based sensing by the first single-channel communication technology,
configuring the second group for selecting the second multi-channel communication technology if the first group detected the first sensing event with a confidence level above a multi-channel threshold confidence level by performing RF-based sensing by the first multi-channel communication technology,
selecting the at least two nodes of the multiple nodes for forming the second group based on the findings obtained by performing RF-based sensing in the first sensing area,
configuring the second group for performing RF-based sensing in the second sensing area based on a difference between the first group and the second group,
configuring the first group for performing RF-based sensing in the first sensing area based on the difference between the first group and the second group,
configuring the second group for performing RF-based sensing in the second sensing area based on external effects influencing an operation of the nodes,
configuring the first group for performing RF-based sensing in the first sensing area based on the external effects influencing the operation of the nodes,
configuring the second group for performing RF-based sensing in the second sensing area based on a difference between the first sensing event and the second sensing event, and
configuring the first group for performing RF-based sensing in the first sensing area based on the difference between the first sensing event and the second sensing event,
forming the first group of nodes by selecting the at least two nodes of the first group from the multiple nodes based on the first sensing event to be detected and/or based on the first sensing area, and
adapting one of the sensing areas by including one or more nodes to the group performing RF-based sensing in the one of the sensing areas, by removing one or more nodes from the group performing RF-based sensing in the one of the sensing areas, by adjusting a direction of a beam between at least two of the nodes of the group performing RF-based sensing in the one of the sensing areas, by adjusting a beam-shape of the beam between the at least two of the nodes of the group performing RF-based sensing in the one of the sensing areas, by adjusting a spatial divergence of the beam between the at least two of the nodes of the group performing RF-based sensing in the one of the sensing areas, by adjusting receive beamforming at at least one of the nodes receiving RF signals for performing RF-based sensing, or by any combination thereof based on findings obtained by performing RF-based sensing in the other sensing area.

Alternatively, or additionally, the method may include one or more of the steps:
configuring the first group for performing RF-based sensing in the first sensing area for detecting the first sensing event based on findings obtained by performing RF-based sensing in the second sensing area,
configuring the first group for performing RF-based sensing by the first single-channel communication technology,
configuring the first group for performing the RF-based sensing by the first single-channel communication technology in dependence of the setting of the communication technology parameters of the first single-channel communication technology that is optimized for detecting the first sensing event, and configuring the first group for performing the RF-based sensing by the first multi-channel communication technology in dependence of the setting of the communication technology parameters of the first multi-channel communication technology that is optimized for detecting an expected sensing event in the first sensing area.

In a further aspect of the present invention a computer program product for performing RF-based sensing in multiple sensing areas by multiple nodes located at different locations is presented. The computer program product comprises program code means for causing a processor to carry out the method provided above when the computer program product is run on the processor.

In a further aspect a computer readable medium having stored the computer program discussed above is presented. Alternatively or additionally the computer readable medium can have the computer program product according to any embodiment of the computer program product stored.

It shall be understood that the RF system discussed above, the method discussed above, the computer program product discussed above, and the computer readable medium discussed above have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
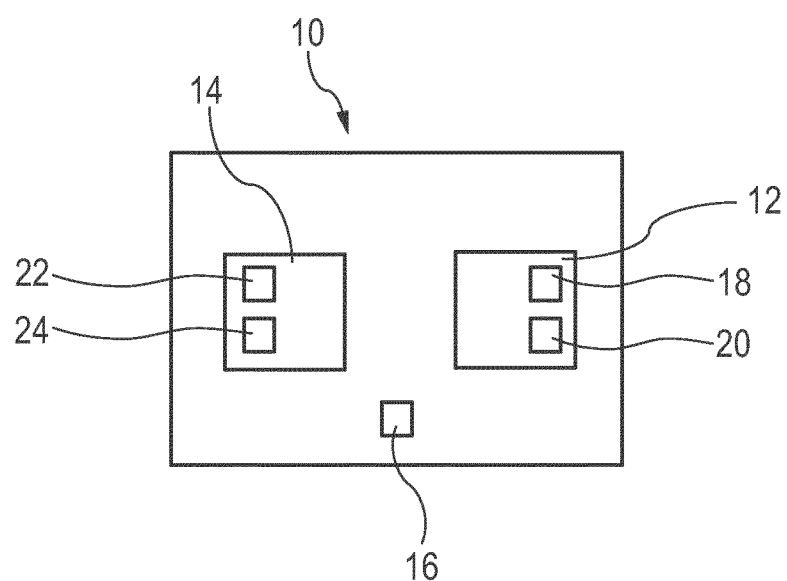
FIG. 1 shows schematically and exemplarily anode for an RF system.

FIG. 1 shows schematically and exemplarily a node 10. The node 10 can be included, for example, in an RF system, such as connected lighting (CL) system 100 shown in FIG. 2, FIG. 3, and FIG. 4. In the following we describe details for the exemplary node 10 that may be used in the CL system 100 before providing details about the functionality of the CL system 100.

The node 10 comprises a control unit 12, a transceiver unit 14, and an antenna array 16. Instead of an antenna array, a single antenna may also be included in the node. The control unit 12 includes a processor 18 and a computer readable medium in form of memory 20.

In this embodiment, the transceiver unit 14 includes two different communication technologies, e.g., based on the Zigbee communication protocol and based on the BLE communication protocol. In other embodiments, the transceiver unit may also include, for example, communication technologies based on Thread, cellular radio, Bluetooth, or WiFi communication protocols, or a communication technology based on any other communication protocol. The transceiver unit 14 includes a Zigbee transceiver 22 and a BLE transceiver 24. The Zigbee transceiver 22 uses a specific Zigbee communication technology in this embodiment. The Zigbee communication technology may, for example, use values of the communication technology parameters of one of the alternatives as defined by the IEEE 802.15.4 communication protocol and/or the Zigbee standard. The BLE transceiver 24 uses BLE communication technology.

The transceiver unit 14 uses the antenna array 16 for transmitting RF signals to nodes and receiving RF signals from nodes of the CL system 100 for exchanging data including RF messages wirelessly between the nodes and for performing RF-based sensing. The RF signals transmitted from one node to another node may be disturbed, e.g., by a tangible entity such as a user within a transmission path between the nodes. The RF signals disturbed by the user can be analyzed in the control unit 12 for performing RF-based sensing.

The memory 20 of the control unit 12 stores a computer program product for operating the CL system 100. The computer program product includes program code means for causing processor 18 to carry out a method for operating the CL system 100 when the computer program product is run on the processor 18, e.g., the method for performing RF-based sensing in multiple sensing areas by multiple nodes located at different locations as presented in FIG. 5. The memory 20 further includes a computer program product for operating the node 10 and optionally also the whole CL system 100, e.g., for controlling the functions of the node and controlling the functions of the nodes of the CL system 100, for example, in order to provide lighting as well as for performing RF-based sensing.

Furthermore, the memory 20 stores settings of communication technology parameters of the communication technologies used for performing RF-based sensing.

Figure 2:
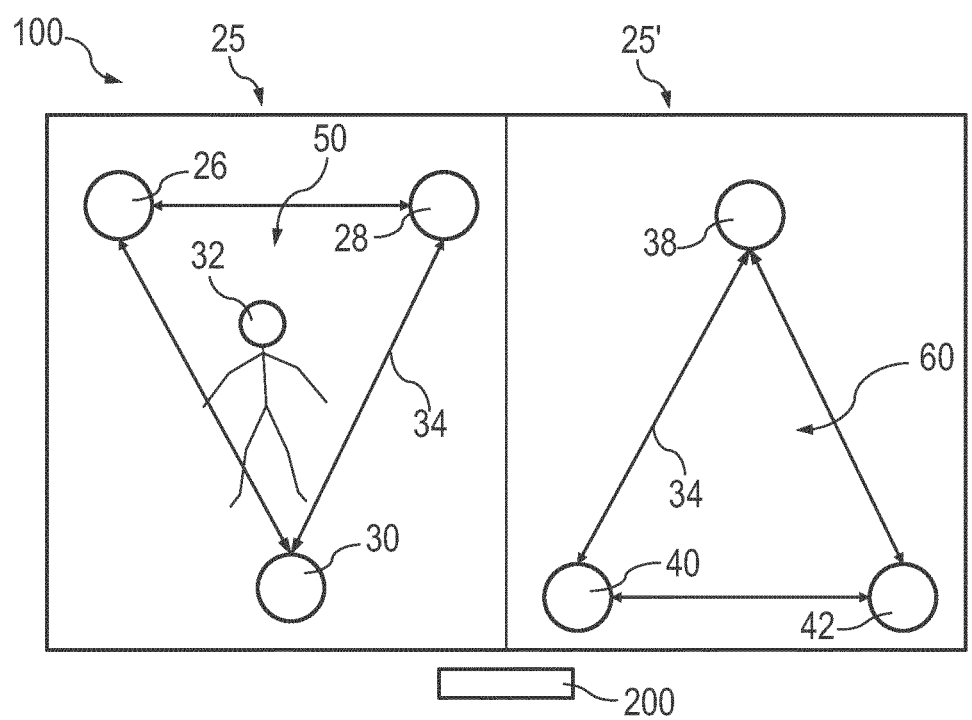
FIG. 2 shows schematically and exemplarily an embodiment of an RF system with two groups of nodes performing RF-based sensing by a single-channel communication technology with a user located in a first sensing area.
Figure 3:
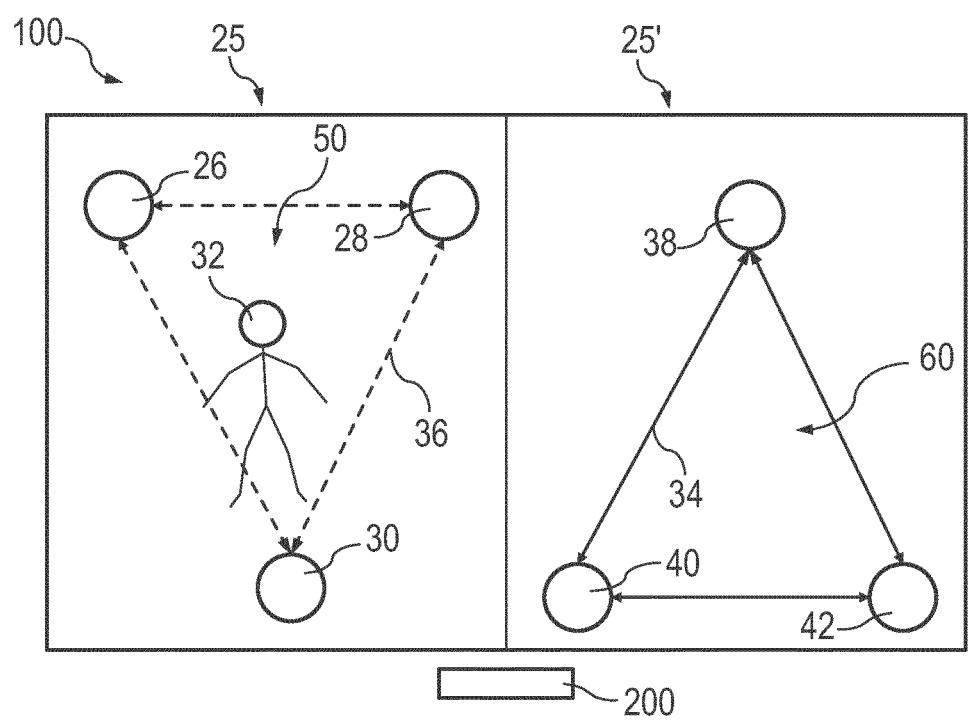
FIG. 3 shows schematically and exemplarily the embodiment of the RF system with a first of the two groups of nodes performing RF-based sensing by a multi-channel communication technology.
Figure 4:
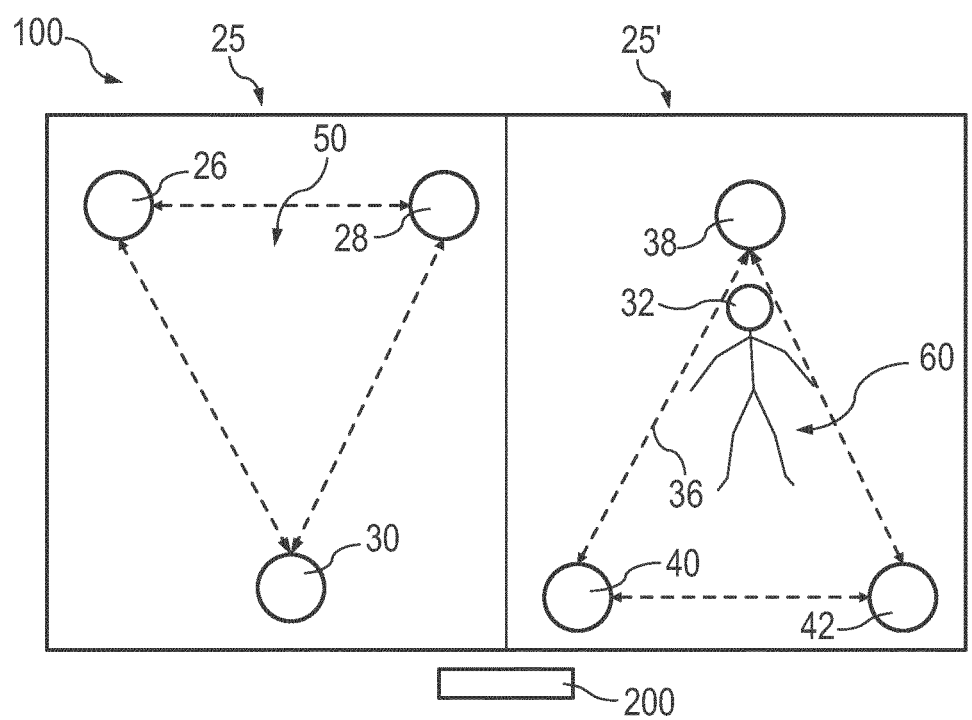
FIG. 4 shows schematically and exemplarily the embodiment of the RF system with the two groups of nodes performing RF-based sensing by the multi-channel communication technology with the user located in a second sensing area.

FIG. 2 to 4 show an embodiment of an RF system in form of CL system 100 including multiple nodes 26, 28, 30, 38, 40, 42 at different locations for performing RF-based sensing in two spatially adjacent sensing areas 50 and 60 based on multiple communication technologies. Each of the two sensing areas is included in a respective room of a building. In other embodiments, the RF system may have a different number of sensing areas, e.g., three, four, or more.

The CL system 100 includes a first group 25 of nodes including the nodes 26, 28, and 30, and a second group 25' of nodes including the nodes 38, 40, and 42. In this embodiment, the locations of the nodes 26, 28, and 30 define the first sensing area 50 and the locations of the nodes 38, 40, and 42 define the second sensing area 60. In other embodiments, the sensing areas may be predefined.

Furthermore, in this embodiment, the CL system 100 is connected to an external server 200. The external server 200 can be used for controlling the nodes 26, 28, 30, 38, 40, and 42 of the CL system 100, e.g., by transmitting control signals to one or more of them. The external server may be, for example, a server of a building management system (BMS).

The CL system 100 can be used for carefully staging RF-based sensing by, during an initial time period, using a first single-channel communication technology by the first group 25 of nodes 26, 28, and 30, and in a subsequent time period switching to a first multi-channel communication technology for the first group 25. The first single-channel communication technology is used to determine whether a possible event just may have occurred in the first sensing area 50. After a possible event has been detected, the CL system 100 subsequently switches the first group 25 to the first multi-channel communication technology in which a frequency hopping communication protocol is used, which deliberately scans through multiple frequencies per RF message for performing RF-based sensing in the first sensing area 50.

For most sensing applications, RF-based sensing does not take place within a single, isolated area. It is usually desired to have high granularity to, among others provide automation and/or control on a room-by-room basis as opposed to on an entire building basis, e.g., a home basis. Furthermore, it is desired to determine flows of people through multiple sensing areas over time, for example, to create heatmaps of most and least used sensing areas, and/or to determine sensing areas that may have been breached in security applications, or the like.

The CL system 100 can therefore be used for applying the findings obtained by performing RF-based sensing in the first sensing area 50 in spatially adjacent areas, e.g., in the second sensing area 60 as a way to optimize detection performance or latency. In other words, if the CL system 100 was, for example, able to conclude that in the first sensing area 50 a currently ongoing event was only successfully detected, i.e., detected with a sufficient confidence level, after switching to the first multi-channel communication technology with a certain setting of communication technology parameters, it causes performing RF-based sensing in the second sensing area 60 by a second multi-channel communication technology by the second group 25' rather than using a second single-channel communication technology. This may allow to directly use a multi-channel communication technology in the second sensing area 60 thus reducing latency.

In the following the functionality of the CL system 100 shown in FIGS. 2 to 4 is explained in more detail.

As shown in FIG. 2, the first group 25 performs RF-based sensing in the first sensing area 50 by a first single-channel communication technology for detecting a first sensing event. In this embodiment, the first sensing event is detection of a user 32 and the first single-channel communication technology is Zigbee 34. In the meantime, also the second group 25' performs RF-based sensing in the second sensing area 60 by Zigbee 34.

In this embodiment, the first sensing event is considered to be detected if the confidence level for detecting the first sensing event is above a first single-channel threshold confidence level. The confidence level is determined by the control unit of node 26. In other embodiments, the confidence level may also be determined, for example, by any of the other nodes of the first group, another group, or by the external server.

In this embodiment, upon detecting the first sensing event in the first sensing area 50, the control unit of node 26 additionally determines whether the first sensing event is detected with sufficient confidence or whether RF-based sensing needs to be performed by a multi-channel communication technology for improving confidence. The confidence is considered to be sufficient, if the confidence level is above a second single-channel threshold confidence level which is higher than the first single-channel threshold confidence level. For example, the first single-channel threshold confidence level may be 30% and the second single-channel threshold confidence level may be 80%, i.e., wherein a confidence level of 100% indicates that an event occurred with certainty and wherein a confidence level of 0% indicates that the event did not occur with certainty.

The control unit of the node 26 then either considers performing RF-based sensing by the first single-channel communication technology sufficient for detecting the first sensing event or selects a first multi-channel communication technology in dependence of the first single-channel communication technology used for detecting the first sensing event and based on findings obtained by performing RF-based sensing by the first single-channel communication technology in the first sensing area. In other embodiments, the first multi-channel communication technology may also be selected based on only one of the first single-channel communication technology used for detecting the first sensing event or based on the findings obtained by performing RF-based sensing by the first single-channel communication technology in the first sensing area.

If the first multi-channel communication technology is selected, the first group 25 performs RF-based sensing by the first multi-channel communication technology in the first sensing area 50. In this embodiment, the first multi-channel communication technology is BLE 36 as shown in FIG. 3.

The control unit of the node 26 configures the second group 25' for performing RF-based sensing in the second sensing area 60 for detecting a second sensing event based on selecting a second single-channel communication technology or a second multi-channel communication technology for performing RF-based sensing in the second sensing area for detecting the second sensing event based on the findings obtained by performing RF-based sensing in the first sensing area 50. In this embodiment, the findings relate to whether the first sensing event was detected with sufficient confidence by performing RF-based sensing by the first single-channel communication technology or whether performing RF-based sensing by the first multi-channel communication technology was required in order to achieve a sufficient confidence in detecting the sensing event. Therefore, the setting of the communication technology parameters used by the first group 25 for performing RF-based sensing is transmitted to the nodes 38, 40, and 42 of the second group 25'. In other embodiments, the setting of the communication technology parameters of the communication technology used for performing RF-based sensing may be optimized for detecting the respective sensing event, e.g., for the first sensing event or for the second sensing event.

In this embodiment, the second group 25' uses the second single-channel communication technology if the first group 25 detected the first sensing event with a confidence level above the second single-channel threshold confidence level by performing RF-based sensing by the first single-channel communication technology and uses the second multi-channel communication technology if the first group detected the first sensing event with a confidence level above a multi-channel threshold confidence level by performing RF-based sensing by the first multi-channel communication technology.

In FIG. 4, it is shown that the second multi-channel communication technology in form of BLE 36 is selected and used for performing RF-based sensing in the second sensing area 60 by the second group 25'.

In other embodiments, the first sensing area and the second sensing area may be different. In this case, the second group may be configured for performing RF-based sensing in the second sensing area based on the difference between the first group and the second group, and/or the first group may be configured for performing RF-based sensing in the first sensing area based on the difference between the first group and the second group.

In yet other embodiments, external effects, such as wireless interference may influence the operation of the nodes of the groups performing RF-based sensing. In this case the second group may be configured for performing RF-based sensing in the second sensing area based on the external effects influencing the operation of the nodes, and/or the first group may be configured for performing RF-based sensing in the first sensing area based on the external effects influencing the operation of the nodes.

In other embodiments, the first sensing area and the second sensing area may be different. In this case, the second group may be configured for performing RF-based sensing in the second sensing area based on the difference between the first sensing event and the second sensing event, and/or the first group may be configured for performing RF-based sensing in the first sensing area based on the difference between the first sensing event and the second sensing event.

Furthermore, the first group of nodes may be formed, for example, by selecting the at least two nodes of the first group from the multiple nodes based on the first sensing event to be detected and/or based on the first sensing area. The first group may also be adapted by including one or more nodes to the first group and/or removing one or more nodes from the first group based on findings obtained by performing RF-based sensing in the second sensing area. The second group may be formed, for example, by selecting the at least two nodes of the second group from the multiple nodes based on the findings obtained by performing RF-based sensing in the first sensing area. One or more sensing areas may also be adapted based on findings obtained by performing RF-based sensing in one or more other of the sensing areas.

In the following further embodiments of the RF system are described.

In a first further embodiment, a first sensing event is first detected by performing RF-based sensing by a first group of nodes by a first single-channel communication technology, e.g., Zigbee, in a first sensing area. The first sensing event is a suspected activity of a user, e.g., opening of a door. Based on the findings obtained by performing RF-based sensing in the first sensing area by the single-channel communication technology, the RF sensing system knows that a door has been opened. Based on the detected opening of the door, it is suspected that a user may enter the first sensing area. Other details such as a walking direction of the user as well as a body size of the user, e.g., whether the user is an adult or a kid are unknown. In order to determine such details, a setting of communication technology parameters is adapted and a first multi-channel communication technology, e.g. BLE, is selected for supplementing the findings obtained by the first single-channel communication technology by a more detail rich event detection within the first sensing area for detecting an expected sensing event. RF-based sensing using the first multi-channel communication technology is performed by the same nodes, i.e., the first group, in order to provide more details. The detail rich event detection allows to detect, for example, a gait of a user such that it can be determined whether the user is indeed walking in, or that the first sensing event detected by performing RF-based sensing by the first single-channel communication technology was just noise from a spatially adjacent area, e.g., a door swinging in the wind or the like.

The RF system may determine, for example, based on digital floorplan blueprints, BMS data, commissioning information, Zigbee neighbor table scan results, or the like, that there is a second sensing area spatially adjacent to the first sensing area. The first sensing area and the second sensing area may be interconnected, for example, by a door or hallway, etc. The RF system then uses the same multi-channel communication technology as second multi-channel communication technology for performing RF-based sensing by a second group of nodes in the second sensing area. In other words, the RF system may conclude that the expected sensing event that was detected in the first sensing area, e.g., that a person is walking within the first sensing area, possibly will propagate towards the second sensing area.

The RF system orchestrates that the second group of nodes for performing RF-based sensing in the second sensing area proactively performs RF-based sensing using the same setting of communication technology parameters that yield an optimal detection performance, accuracy, and/or reliability in the first sensing area. For instance, in a warehouse, the RF system determines that a worker carrying a cardboard box is moving in the first sensing area. The RF system may determine an optimal setting of communication technology parameters for performing RF-based sensing in order to detect that the worker is carrying the cardboard box, e.g., RF-based sensing 80% on the multi-channel communication technology with +6 dBm output and 20% on the single-channel communication technology. The percentage of communication technology refers to a number of RF messages or a time interval in which the respective communication technology is active in case that the communication technologies are interleaved.

Subsequently, the RF system configures the second group such that it performs RF-based sensing in the second sensing area initially using the multi-channel communication technology instead of performing an initial coarse detection via the single-channel communication technology. Using consistent settings of communication technology parameters across the first and second sensing areas may allow easing a stitching of event paths, such as a motion path, occurring first in the first sensing area and propagating later to the second sensing area.

In a second further embodiment, the RF system may operate in a similar manner as in the first further embodiment. But instead of using the same setting of communication technology parameters in the second sensing area as used in the first sensing area, the RF system may conclude that the first sensing area and the second sensing area are different to each other. In this case using the same setting of communication technology parameters may not be optimal for performing RF-based sensing in the second sensing area. The difference between the first sensing area and the second sensing are may be caused, for example, by a mismatch in an amount, type, and/or location of the nodes and possible other wirelessly operating devices in the second sensing area compared to the first sensing area. For example, spatially adjacent rooms may be very different, both in residential and office applications. Hence, the setting of the communication technology parameters that worked best in the first sensing area, e.g. in a first room, may not be optimal for the second sensing area, e.g., in a second room, for example, because the second room has fewer nodes, e.g., lights, or the lights performing RF-based sensing are less powerful from a processing perspective. Furthermore, the second room may suffer from other wireless interference, e.g., a microwave oven, or the like. In case that the sensing areas or spatially adjacent rooms are different, an optimal setting of communication technology parameters for correctly identifying the expected sensing event in the first sensing area, e.g., a person walking at a specific speed, may fail to provide sufficient detection performance in the second sensing area for detecting the same sensing event and may only be able to detect a second sensing event in form of a person walking in the second room, but not its speed.

The RF system may thus adapt the setting of the communication technology parameters used by the second group for performing RF-based sensing to account for the differences between the first sensing area and the second sensing area. For example, the second group may use concurrent Zigbee and BLE RF-based sensing, with a partial overlap in frequency hopping channels with respect to the Zigbee channel.

Optionally, once the person of interest has fully propagated from the first sensing area to the second sensing area, the RF system may suffer from non optimal detection performance due to a lack of nodes or well-positioned nodes. In this case, the RF system may upon ceasing RF-based sensing by the multi-channel communication technology in the first sensing area form the second group by including one or more nodes from the first group in the second group. These nodes may have to perform RF-based sensing through a wall between the first room and the second room. The RF system may correct the channel state information (CSI) and/or received signal strength indication (RSSI) data obtained by these nodes for attenuation caused by the wall.

If the second group is able to detect either the second sensing event corresponding to the expected sensing event or an unexpected sensing event with a higher confidence level than the first group, these findings may be provided to the first group. In reaction, of these findings, the second group may inform the first group which setting of communication technology parameters is optimal. The first group may adapt its setting of communication technology parameters accordingly in order to improve detection performance in case that the user, for example, walks back into the first sensing area.

In a third further embodiment, the RF system may be suffering from some temporary effects, e.g., in the second sensing area, that render using the setting of communication technology parameters used in the first sensing area non-optimal in the second sensing area. For example, when the same setting of communication technology parameters is used by the second group, the second group performing RF-based sensing in the second sensing area may not be able to reach an expected confidence level for detecting the second sensing event, for example, due to a local spike in wireless traffic. Wireless traffic may be caused, for example, by some of the nodes in the second sensing area being critical routing devices within a Zigbee mesh network. Furthermore, for example, a microwave oven may be used in a kitchen which may add significant noise in the 2.4 GHz spectrum, or the like.

In this case, the RF system may configure the second group such that a temporarily modified setting of communication technology parameters is used taking into account the external effects compared to the setting of communication technology parameters without external effects. The RF system may consciously stay with this setting of communication technology parameters, even if this setting was non-optimal under normal circumstances, as long as it can confirm that the external effects deteriorating the RF-based sensing continue. Once wireless interference caused by the external effects is gone, the RF system may configure the second group to perform RF-based sensing in the second sensing area based on using the setting of communication technology parameters without external effects, e.g., the setting of communication technology parameters used in the first sensing area.

In a fourth further embodiment, the RF system configures the second group for performing RF-based sensing in the second sensing area initially based on the setting of communication technology parameters used by the first group. When detecting that this setting is not sufficient for achieving a sufficient confidence level for detecting the second sensing event, the RF system adapts the setting of communication technology parameters used by the second group and performs RF-based sensing based on the adapted setting of communication technology parameters, e.g., using a frequency hopping protocol. The adapted setting of communication technology parameters may, for example, be optimized for improving the confidence level.

The first sensing event and the second sensing event may differ from each other. For example, a user may be walking at a certain speed from the first sensing area to the second sensing area. Upon entering the second sensing area, the user may pick up an object, e.g., his laptop PC, and return to the first sensing area. This changes the RF fingerprint to be detected by the RF system, such that the previous setting of communication technology parameters used in the first sensing area is no longer suitable or preferred for detecting the sensing events. In particular, due to picking up the laptop, the RF fingerprint changes as the user and laptop PC do not just absorb RF signals but also reflect them due to metal in the laptop PC. Therefore, the setting of communication technology parameters is adapted by the second group and subsequently provided to the first group in order to improve the detection performance. The setting may, for example, include a time-shared RF-based sensing on Zigbee and non-overlapping BLE channels. This may allow the RF system to quickly recover from potential lagging memory effects and to adapt to whatever a context requires per sensing area.

Figure 5:
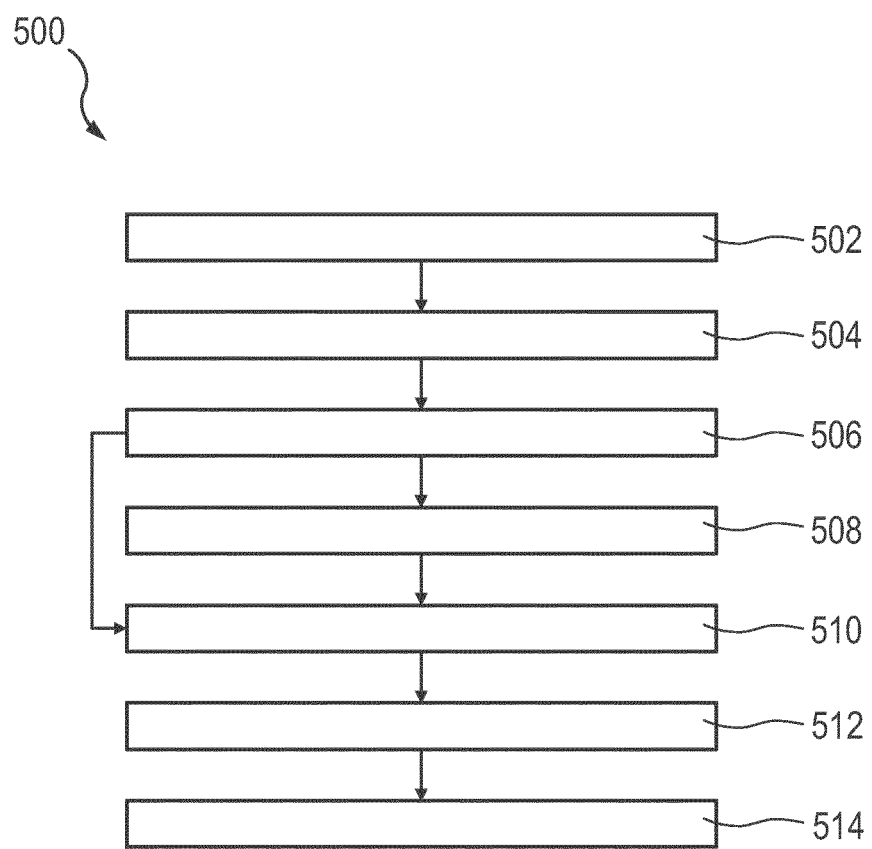
FIG. 5 shows an embodiment of a method for performing RF-based sensing in multiple sensing areas by multiple nodes located at different locations.

FIG. 5 shows an embodiment of a method 500 for performing RF-based sensing in multiple sensing areas by multiple nodes located at different locations. In this embodiment, RF-based sensing is performed in the multiple sensing areas based on multiple communication technologies. The multiple nodes may be, for example, included in an RF system, such as CL system 100 disclosed in FIGS. 2 to 4. The method 500 may be used, for example, for performing RF-based sensing by CL system 100.

In step 502, a first group of nodes is formed by selecting at least two nodes of the first group from the multiple nodes based on the first sensing event to be detected. In this embodiment, the first sensing event is detection of a motion in a first sensing area. The first sensing area is defined by the nodes of the first group. In other embodiments, selection of the nodes of the first group from the multiple nodes may alternatively or additionally be based on the first sensing area. The first sensing area may alternatively be predetermined.

In step 504, RF-based sensing is performed by the first group in a first sensing area for detecting a first sensing event by a first single-channel communication technology in dependence of a setting of communication technology parameters of the first single-channel communication technology that is optimized for detecting the first sensing event.

In this embodiment, a predefined setting of communication technology parameters for detecting motion is used. In particular, Zigbee communication technology is used for performing RF-based sensing.

In other embodiments, a step of configuring the first group for performing RF-based sensing in a first sensing area for detecting the first sensing event may be performed, e.g., for optimizing the setting of communication technology parameters. This may include a calibration of the setting of communication technology parameters in order to optimize them.

Step 504 is performed until the first sensing event is detected in the first sensing area. In this embodiment, the first sensing event is detected if a confidence level for the detection is above a first single-channel threshold confidence level. Upon detecting the first sensing event in the first sensing area, step 506 is performed.

In step 506, a first multi-channel communication technology is selected based on findings obtained by performing RF-based sensing by the first single-channel communication technology in the first sensing area. In this embodiment, the findings include whether the confidence level of the detection is below a second single-channel threshold confidence level. If the confidence level is above the first single-channel threshold confidence level, but below the second single-channel threshold confidence level, the first multi-channel communication technology is selected and step 508 is performed. If the confidence level is also above the second single-channel threshold confidence level the first single-channel communication technology is considered to be sufficient for detecting the first sensing event, no first multi-channel communication technology is selected, and step 510 is performed.

In other embodiments, other findings may be considered for selecting the first multi-channel communication technology. For example, a specific multi-channel communication technology may be selected as first multi-channel communication technology in dependence of the confidence level, e.g., based on a look-up-table (LUT). In other embodiments, the first multi-channel communication technology may alternatively or additionally be selected in dependence of the first single-channel communication technology used for detecting the first sensing event.

In step 508, RF-based sensing is performed by the first group based on the first multi-channel communication technology in the first sensing area for detecting the first sensing event.

In other embodiments, the RF-based sensing may be performed by the first group by the first multi-channel communication technology in dependence of a setting of communication technology parameters of the first multi-channel communication technology that is optimized for detecting an expected sensing event in the first sensing area. The expected sensing event may be of identical type as the first sensing event or may be of another type, e.g., if the first sensing event is detection of motion of the user, the expected sensing event may be, for example, an activity of the user, such as walking, cooking, sitting down, falling, or any other activity.

In step 510, a second group of nodes including at least two of the multiple nodes is configured for performing RF-based sensing in a second sensing area for detecting a second sensing event based on findings obtained by performing RF-based sensing in the first sensing area. In this embodiment, the findings include whether the first single-channel communication technology is sufficient for detecting the first sensing event with sufficient confidence or whether the first multi-channel communication technology is used for performing RF-based sensing. The configuring of the second group is based on selecting a second single-channel communication technology or a second multi-channel communication technology for performing RF-based sensing in the second sensing area by the second group for detecting the second sensing event. In particular, the second single-channel communication technology is selected for performing RF-based sensing in the second sensing area by the second group if the first group detected the first sensing event with a confidence level above the second single-channel threshold confidence level by performing RF-based sensing by the first single-channel communication technology. The second multi-channel communication technology is selected for performing RF-based sensing in the second sensing area by the second group if the first group detected the first sensing event with a confidence level above a multi-channel threshold confidence level by performing RF-based sensing by the first multi-channel communication technology.

In other embodiments, the method may include a step of forming the second group of nodes including the at least two of the multiple nodes based on the findings obtained by performing RF-based sensing in the first sensing area. In this case, the at least two nodes of the second group may be selected based on the findings obtained by performing RF-based sensing in the first sensing area.

In step 512, RF-based sensing is performed in the second sensing area for detecting the second sensing event. In this embodiment the RF-based sensing is performed based on the second single-channel communication technology or the second multi-channel communication technology in the second sensing area for detecting the second sensing event in dependence of which of the communication technologies is selected when configuring the second group in step 510. Furthermore, in this embodiment, the second sensing event is identical to the first sensing event. In other embodiments, the first sensing event and the second sensing event may be different sensing events.

In step 514, an action is performed upon detecting the second sensing event. In this embodiment, the action is providing lighting in the second sensing area. In other embodiments, other actions may be performed upon detecting the second sensing event.

In other embodiments, the method may include, for example, configuring the second group for performing RF-based sensing in the second sensing area based on a difference between the first group and the second group and/or based on external effects influencing an operation of the nodes. The method may alternatively or additionally include configuring the first group for performing RF-based sensing in the first sensing area based on the difference between the first group and the second group and/or based on the external effects influencing the operation of the nodes. In yet other embodiments, the first group may be adapted by including one or more nodes to the first group and/or removing one or more nodes from the first group based on findings obtained by performing RF-based sensing in the second sensing area. One of the sensing areas may also be adapted based on findings obtained by performing RF-based sensing in the other sensing area.

While the invention has been illustrated and described in detail in the drawings and foregoing description, such illustration and description are to be considered illustrative or exemplary and not restrictive; the invention is not limited to the disclosed embodiments. For example, it is possible to operate the invention in a smart home system, a BMS, or in any other RF system including multiple sensing areas. The invention may allow improving detection performance and reduce latency of the RF system since the RF system may adapt settings of communication technology parameters of communication technologies for performing RF-based sensing in the multiple sensing areas based on findings obtained in one of the sensing areas.

Other variations to the disclosed embodiments can be understood and effected by those skilled in the art in practicing the claimed invention, from a study of the drawings, the disclosure, and the appended claims.

In the claims, the word "comprising" and "including" does not exclude other elements or steps, and the indefinite article "a" or "an" does not exclude a plurality.

A single unit, processor, or device may fulfill the functions of several items recited in the claims. The mere fact that certain measures are recited in mutually different dependent claims does not indicate that a combination of these measures cannot be used to advantage.

Operations like performing RF-based sensing by a first group of nodes including at least two of the multiple nodes in a first sensing area for detecting a first sensing event, configuring a second group of nodes including at least two of the multiple nodes for performing RF-based sensing in a second sensing area for detecting a second sensing event based on findings obtained by performing RF-based sensing in the first sensing area, et cetera performed by one or several units, nodes, or devices can be performed by any other number of units, nodes, or devices. These operations and/or the method can be implemented as program code means of a computer program and/or as dedicated hardware.

A computer program product may be stored/distributed on a suitable medium, such as an optical storage medium, or a solid-state medium, supplied together with or as part of other hardware, but may also be distributed in other forms, such as via the Internet, Ethernet, or other wired or wireless telecommunication systems.

Any reference signs in the claims should not be construed as limiting the scope.

The present invention relates to performing RF-based sensing in multiple sensing areas by multiple nodes located at different locations. A first group of nodes includes at least two of the multiple nodes and performs RF-based sensing in a first sensing area for detecting a first sensing event. A second group of nodes including at least two of the multiple nodes is configured for performing RF-based sensing in a second sensing area for detecting a second sensing event based on findings obtained by performing RF-based sensing in the first sensing area. The nodes may perform RF-based sensing based on multiple communication technologies. The findings may include which communication technology allows confidently detecting a sensing event.

The invention claimed is:

1. A radio frequency system including multiple nodes at different locations for performing radio frequency based sensing in multiple sensing areas, wherein the multiple nodes are configured for performing radio frequency based sensing in multiple sensing areas based on multiple communication technologies, and
wherein a first group of nodes including at least two of the multiple nodes is configured for performing radio frequency based sensing in a first sensing area for detecting a first sensing event, and
wherein the radio frequency system is configured for configuring a second group of nodes including at least two of the multiple nodes for performing radio frequency based sensing in a second sensing area for detecting a second sensing event; wherein the radio frequency system is configured to obtain findings obtained by performing radio frequency based sensing in the first sensing area; and wherein the second group is configured based on the obtained findings; and wherein the configuring of the second group is based on selecting a second single-channel communication technology or a second multi-channel communication technology for performing radiofrequency based sensing in the second sensing area by the second group for detecting the second sensing event; and
wherein the first group is configured for performing radio frequency based sensing by a first single-channel communication technology, and upon detecting the first sensing event in the first sensing area,
to select a first multi-channel communication technology in dependence of the first single-channel communication technology used for detecting the first sensing event and/or based on findings obtained by performing radio frequency based sensing by the first single-channel communication technology in the first sensing area, and
to perform radio frequency based sensing based on the first multi-channel communication technology in the first sensing area,
wherein the radio frequency system is configured for configuring the second group for selecting the second single-channel communication technology if the first group detected the first sensing event with a confidence level above a single-channel threshold confidence level by performing radio frequency based sensing by the first single-channel communication technology and/or for configuring the second group for selecting the second multi-channel communication technology if the first group detected the first sensing event with a confidence level above a multi-channel threshold confidence level by performing radio frequency based sensing by the first multi-channel communication technology.

2. The radio frequency system according to claim 1, wherein the first group is configured for performing, in dependence of a setting of communication technology parameters of the first single-channel communication technology that is optimized for detecting the first sensing event, the radio frequency based sensing by the first single-channel communication technology, and/or
wherein the first group is configured for performing, in dependence of a setting of communication technology parameters of the first multi-channel communication technology that is optimized for detecting an expected sensing event in the first sensing area, the radio frequency based sensing by the first multi-channel communication technology, and wherein the first sensing event and the expected sensing event may be sensing events of identical type or sensing events of a different type.

3. The radio frequency system according to claim 1, wherein the radio frequency system is configured for selecting the at least two nodes of the second group from the multiple nodes for forming the second group based on the findings obtained by performing radio frequency based sensing in the first sensing area.

4. The radio frequency system according to claim 1, wherein the radio frequency system is configured for configuring the second group for performing radio frequency based sensing in the second sensing area based on a difference between the first group and the second group, and/or wherein the radio frequency system is configured for configuring the first group for performing radio frequency based sensing in the first sensing area based on the difference between the first group and the second group.

5. The radio frequency system according to claim 1, wherein the radio frequency system is configured for configuring the second group for performing radio frequency based sensing in the second sensing area based on external effects influencing an operation of the nodes, and/or wherein the radio frequency system is configured for configuring the first group for performing radio frequency based sensing in the first sensing area based on the external effects influencing the operation of the nodes.

6. The radio frequency system according to claim 1, wherein the radio frequency system is configured for configuring the second group for performing radio frequency based sensing in the second sensing area further based on a difference between the first sensing event and the second sensing event, and/or wherein the radio frequency system is configured for configuring the first group for performing radio frequency based sensing in the first sensing area based on the difference between the first sensing event and the second sensing event.

7. The radio frequency system according to claim 1, wherein the radio frequency system is configured for forming the first group of nodes by selecting the at least two nodes of the first group from the multiple nodes further based on the first sensing event to be detected and/or based on the first sensing area.

8. The radio frequency system according to claim 1, wherein the radio frequency system configured for adapting one of the sensing areas by including one or more nodes to the group performing radio frequency based sensing in the one of the sensing areas, by removing one or more nodes from the group performing radio frequency based sensing in the one of the sensing areas by adjusting a direction of a beam between at least two of the nodes of the group performing radio frequency based sensing in the one of the sensing areas, by adjusting a beam-shape of the beam between the at least two of the nodes of the group performing radio frequency based sensing in the one of the sensing areas, by adjusting a spatial divergence of the beam between the at least two of the nodes of the group performing radio frequency based sensing in the one of the sensing areas, by adjusting receive beamforming at at least one of the nodes receiving radio frequency signals for performing radio frequency based sensing, or by any combination thereof based on findings obtained by performing radio frequency based sensing in the other sensing area.

9. A method for performing radio frequency based sensing in multiple sensing areas by multiple nodes located at different locations, wherein the multiple nodes are configured for performing radio frequency based sensing in multiple sensing areas based on multiple communication technologies, and wherein the method including the steps:
  performing radio frequency based sensing by a first group of nodes including at least two of the multiple nodes in a first sensing area for detecting a first sensing event, and
  configuring, based on findings obtained by performing radio frequency based sensing in the first sensing area, a second group of nodes including at least two of the multiple nodes for performing radio frequency based sensing in a second sensing area for detecting a second sensing event; and wherein the configuring of the second group is based on detecting a second single-channel communication technology or a second multi-channel communication technology for performing radiofrequency based sensing in the second sensing area by the second group for detecting the second sensing, event; and
  configured the first group for performing radio frequency based sensing by a first single-channel communication technology, and upon detecting the first sensing event in the first sensing area,
    selecting a first multi-channel communication technology in dependence of the first single-channel communication technology used for detecting the first sensing event and/or based on findings obtained by performing radio frequency based sensing by the first single-channel communication technology in the first sensing area, and
    performing radio frequency based sensing based on the first multi-channel communication technology in the first sensing area; and wherein the method further comprises
  configured the radio frequency system for configuring the second group for selecting the second single-channel communication technology if the first group detected the first sensing event with a confidence level above a single-channel threshold confidence level by performing radio frequency based sensing by the first single-channel communication technology and/or for configuring the second group for selectin the second multi-channel communication technology if the first group detected the first sensing event with a confidence level above a multi-channel threshold confidence level by performing radio frequency based sensing by the first multi-channel communication technology.

10. The method according to claim 9, wherein the method comprises one or more of the steps:
  performing radio frequency based sensing in the second sensing area for detecting the second sensing event,
  performing radio frequency based sensing in multiple sensing areas based on multiple communication technologies,
  performing the radio frequency based sensing by the first group by a first single-channel communication technology,
  upon detecting the first sensing event in the first sensing area, selecting a first multi-channel communication technology in dependence of the first single-channel communication technology used for detecting the first sensing event and/or based on findings obtained by performing radio frequency based sensing by the first single-channel communication technology in the first sensing area,
  performing radio frequency based sensing based on the first multi-channel communication technology in the first sensing area,
  performing the radio frequency based sensing by the first group by the first single-channel communication technology in dependence of a setting of communication technology parameters of the first single-channel communication technology that is optimized for detecting the first sensing event,
  performing the radio frequency based sensing by the first group by the first multi-channel communication technology in dependence of a setting of communication technology parameters of the first multi-channel communication technology that is optimized for detecting an expected sensing event in the first sensing area,
  configuring the second group based on selecting a second single-channel communication technology or a second multi-channel communication technology for performing radio frequency based sensing in the second sensing area for detecting the second sensing event based on the findings obtained by performing radio frequency based sensing in the first sensing area, performing radio frequency based sensing based on the second single-channel communication technology or the second multi-channel communication technology in the second sensing area for detecting the second sensing event, configuring the second group for selecting the second single-channel communication technology if the first group detected the first sensing event with a confidence level above a single-channel threshold confidence level by performing radio frequency based sensing by the first single-channel communication technology, configuring the second group for selecting the second multi-channel communication technology if the first group detected the first sensing event with a confidence level above a multi-channel threshold confidence level by performing radio frequency based sensing by the first multi-channel communication technology, selecting the at least two nodes of the multiple nodes for forming the second group based on the findings obtained by performing radio frequency based sensing in the first sensing area, configuring the second group for performing radio frequency based sensing in the second sensing area based on a difference between the first group and the second group, configuring the first group for performing radio frequency based sensing in the first sensing area based on the difference between the first group and the second group, configuring the second group for performing radio frequency based sensing in the second sensing area based on external effects influencing an operation of the nodes, configuring the first group for performing radio frequency based sensing in the first sensing area based on the external effects influencing the operation of the nodes, configuring the second group for performing radio frequency based sensing in the second sensing area based on a difference between the first sensing event and the second sensing event, and configuring the first group for performing radio frequency based sensing in the first sensing area based on the difference between the first sensing event and the second sensing event, forming the first group of nodes by selecting the at least two nodes of the first group from the multiple nodes based on the first sensing event to be detected and/or based on the first sensing area, and adapting one of the sensing areas by including one or more nodes to the group performing radio frequency based sensing in the one of the sensing areas, by removing one or more nodes from the group performing radio frequency based sensing in the one of the sensing areas, by adjusting a direction of a beam between at least two of the nodes of the group performing radio frequency based sensing in the one of the sensing areas, by adjusting a beam-shape of the beam between the at least two of the nodes of the group performing radio frequency based sensing in the one of the sensing areas, by adjusting a spatial divergence of the beam between the at least two of the nodes of the group performing radio frequency based sensing in the one of the sensing areas, by adjusting receive beamforming at at least one of the nodes receiving radio frequency signals for performing radio frequency based sensing, or by any combination thereof based on findings obtained by performing radio frequency based sensing in the other sensing area.

11. A computer program product for performing radio frequency based sensing in multiple sensing areas by multiple nodes located at different locations, wherein the computer program product comprises program code means for causing a processor of the radio frequency system according to claim 1, when the computer program product is run on the processor of the radio frequency system.

12. A computer readable medium having stored the computer program product of claim 11.

* * * * *